(No Model.)

7 Sheets—Sheet 1.

J. SHELDON.
MACHINE FOR ROLLING SCREWS.

No. 315,349. Patented Apr. 7, 1885.

Witnesses.
Richard Skerrett
Arthur J. Powell

Inventor.
John Sheldon (No Model.) 7 Sheets—Sheet 3.

J. SHELDON.
MACHINE FOR ROLLING SCREWS.

No. 315,349. Patented Apr. 7, 1885.

Witnesses.
Richard Skerrett
Arthur J. Powell

Inventor.
John Sheldon (No Model.) 7 Sheets—Sheet 4.
J. SHELDON.
MACHINE FOR ROLLING SCREWS.
No. 315,349. Patented Apr. 7, 1885.
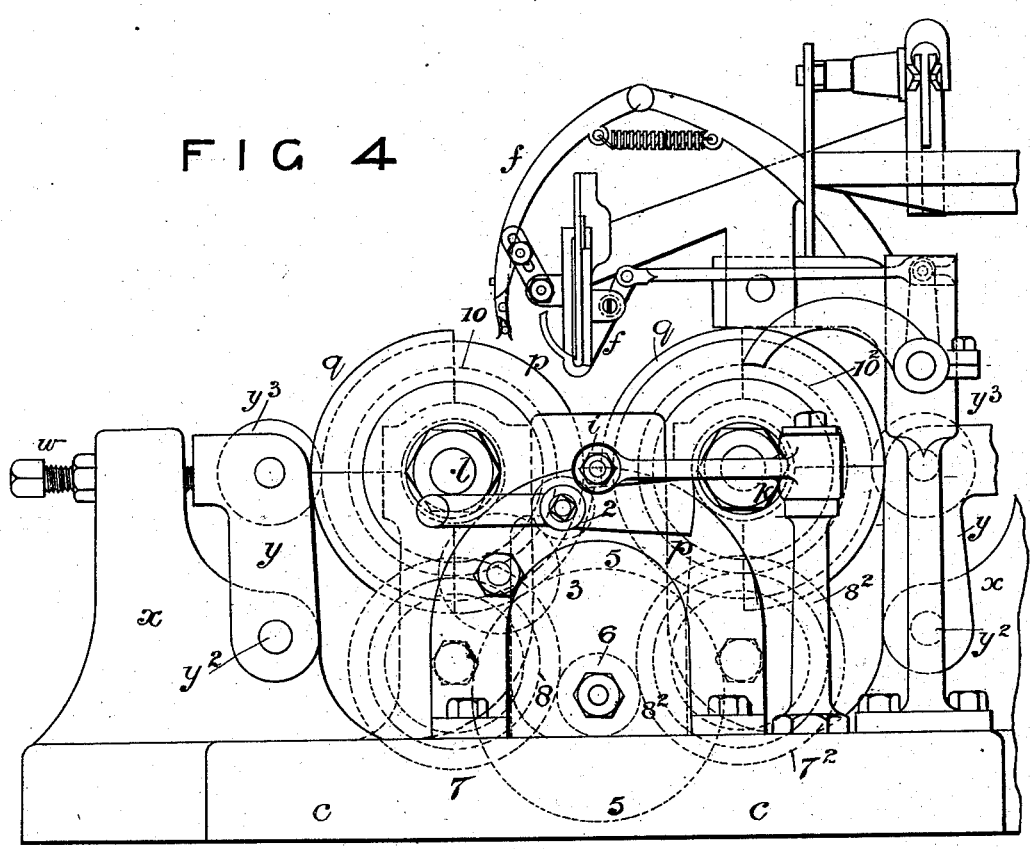
Witnesses.
Richard Skerrett
Arthur J. Powell
Inventor.
John Sheldon (No Model.) 7 Sheets—Sheet 5.
J. SHELDON.
MACHINE FOR ROLLING SCREWS.
No. 315,349. Patented Apr. 7, 1885.
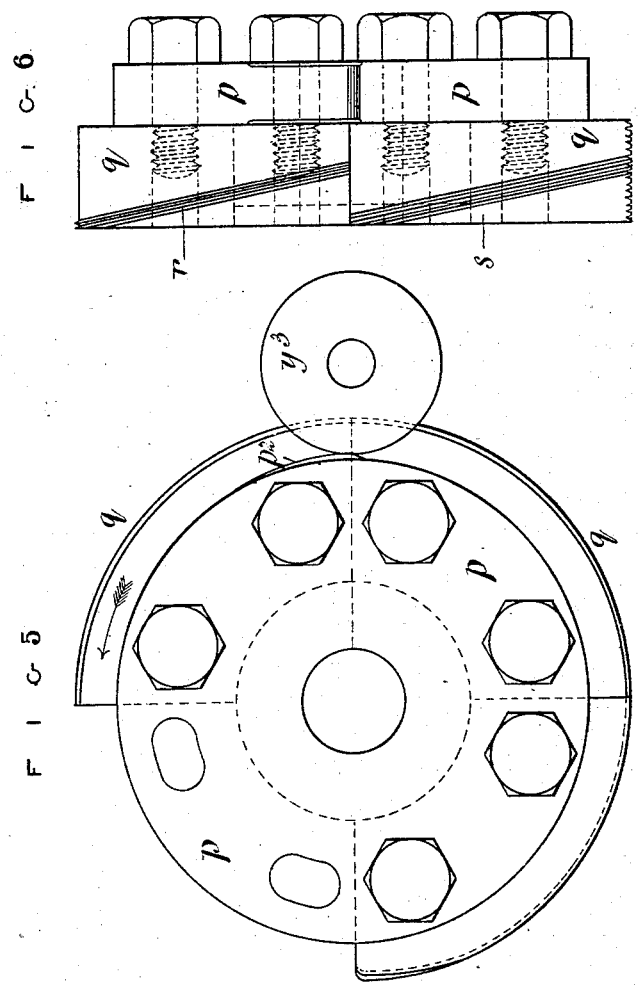

(No Model.)　　　　　　　　　　　　　　　　　　　　7 Sheets—Sheet 6.
J. SHELDON.
MACHINE FOR ROLLING SCREWS.
No. 315,349.　　　　　　　　　　　　Patented Apr. 7, 1885.
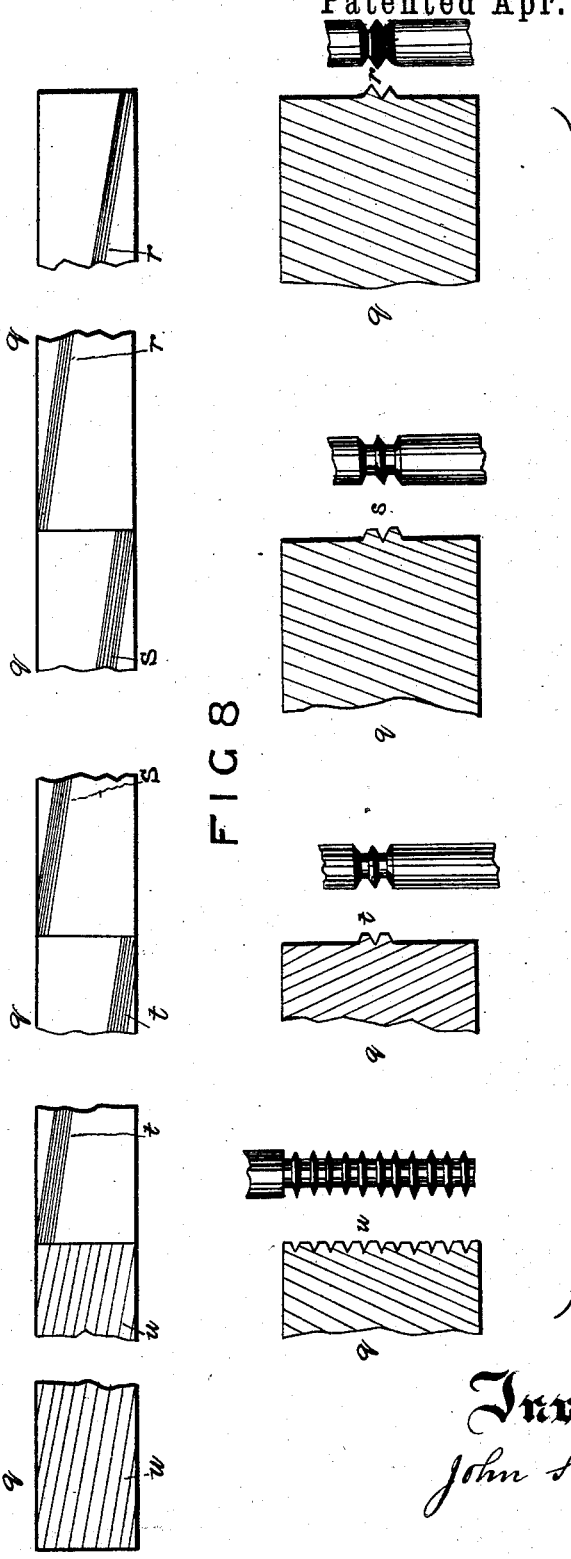
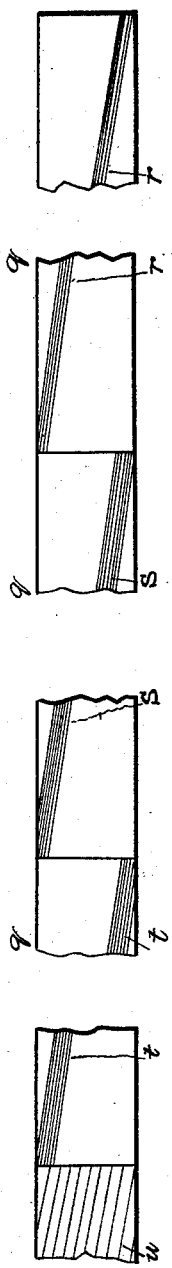
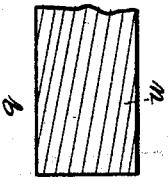
Witnesses.
Richard Skerrett
Arthur J. Powell
Inventor.
John Sheldon.

(No Model.) 7 Sheets—Sheet 7.
J. SHELDON.
MACHINE FOR ROLLING SCREWS.
No. 315,349. Patented Apr. 7, 1885.
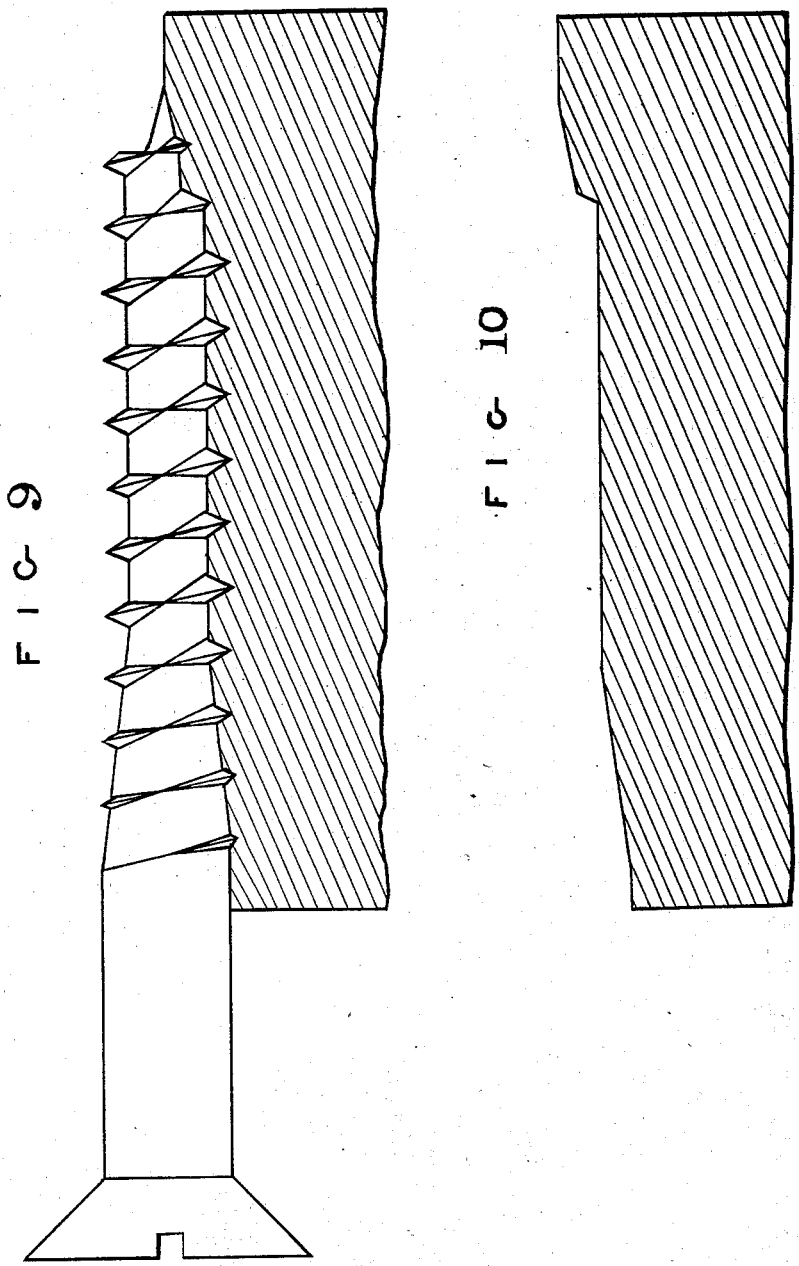
Witnesses.
Richard Skerrett
Arthur J. Powell
Inventor.
John Sheldon

UNITED STATES PATENT OFFICE.

JOHN SHELDON, OF BIRMINGHAM, COUNTY OF WARWICK, ENGLAND.

MACHINE FOR ROLLING SCREWS.

SPECIFICATION forming part of Letters Patent No. 315,349, dated April 7, 1885.

Application filed September 15, 1884. (No model.) Patented in England February 28, 1884, No. 4,106; in Belgium August 2, 1884, No. 65,931; in France August 5, 1884, No. 163,638; in Canada October 13, 1884, No. 20,375, and in Austria-Hungary October 20, 1884, No. 29,957 and No. 47,273.

*To all whom it may concern:*

Be it known that I, JOHN SHELDON, a subject of the Queen of Great Britain, residing at Birmingham, in the county of Warwick, England, mechanical engineer, have invented certain new or improved machinery for the manufacture of metallic screws and screw-bolts and other metallic articles having screw-threads upon them, (for which I have received Letters Patent in Belgium dated August 2, 1884, No. 65,931, and in France dated August 5, 1884, and made application for Letters Patent in Great Britain No. 4,106, dated February 28, 1884; in Austria dated August 6, 1884, and in Germany dated August 12, 1884,) of which the following is a specification.

My invention consists of machinery for worming or forming the threads of metallic screws or screw-bolts and other articles having screw-threads upon them, the parts of the said machinery being constructed, arranged, and worked substantially as hereinafter described, and illustrated in the accompanying drawings.

My invention is particularly applicable to the manufacture of iron screws of the kind commonly called "wood-screws," and I will describe it in connection with the manufacture of wood-screws.

Figure 1:
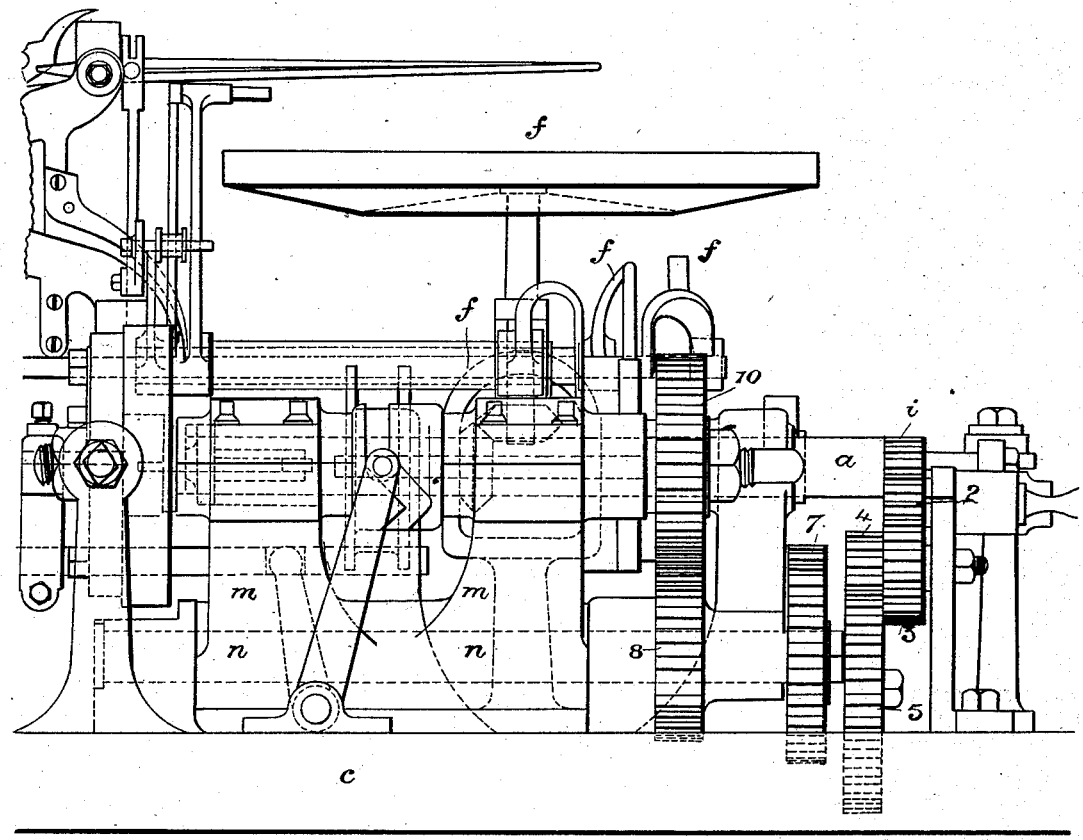
Figure 2:
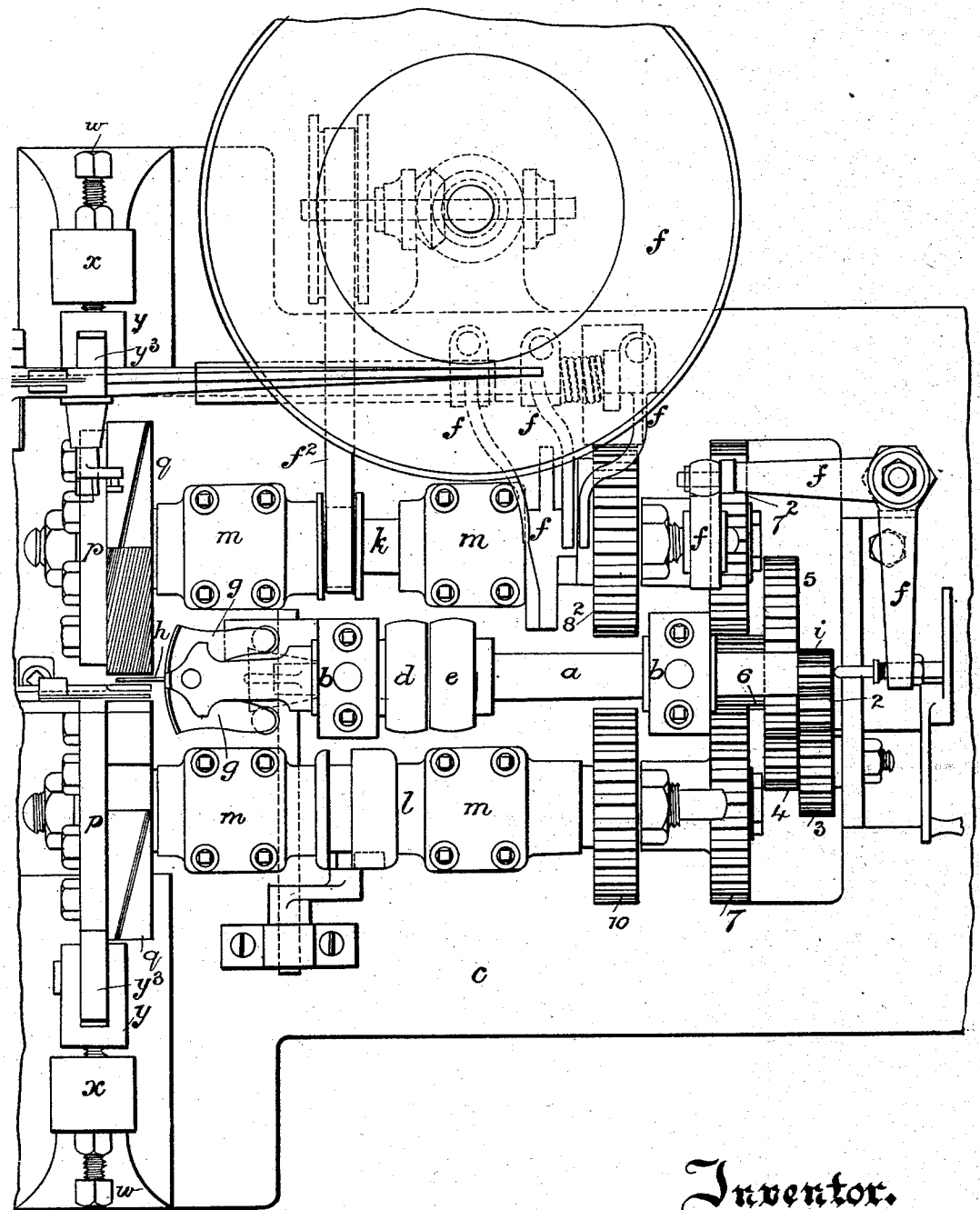
Figure 3:
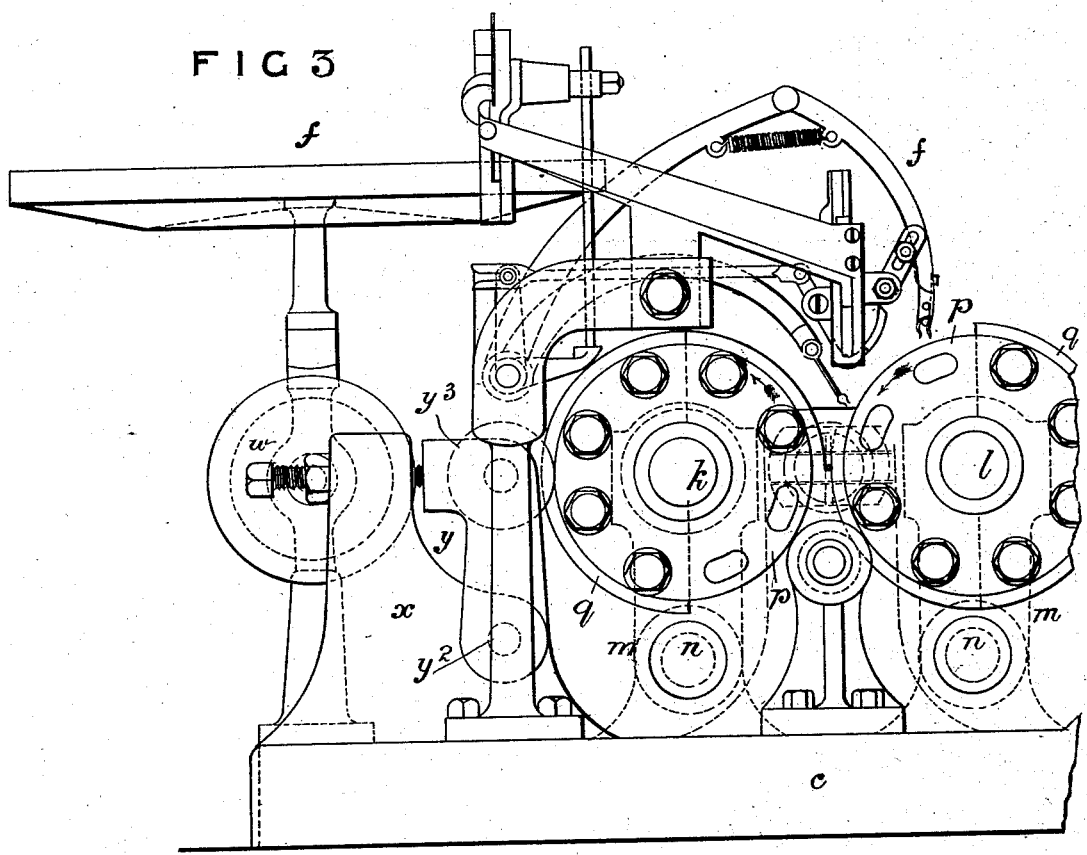

Figure 1 represents in side elevation, and Fig. 2 in plan, worming machinery containing my improvements. Fig. 3 is an elevation of the front end of the machinery, and Fig. 4 an elevation of the rear end of the machinery. The other figures represent parts of the machinery drawn to a larger scale than Figs. 1, 2, 3, and 4, and also an illustrative diagram.

The same letters of reference indicate the same parts of the machinery in the several figures.

The machinery is driven from the middle hollow shaft or spindle, *a*, working in bearings *b* on the base *c* of the machinery. Rotary motion is communicated to this shaft or spindle *a* from a steam-engine or other prime mover by a band driving the fast pulley *d*.

*e* is a loose pulley for throwing the machinery out of gear with the prime mover, as is well understood. The front end of the spindle *a* carries the jaws or clams *g*, by which the blank *h*, on which a screw-thread is to be made, is held and rotated. The shank or body of the blank *h* is supported by a vertical support underneath it. (Not represented in the drawings.) The jaws or clams *g* are constructed and operated precisely as jaws or clams in other screw-making machinery are constructed and operated, and I do not think it necessary to describe their construction and operation. The blanks to be screw-threaded are supplied to the jaws or clams *g* from a hopper by means of feeding mechanism, which I do not think it necessary to describe, as the said feeding mechanism and hopper are commonly employed in other screw-making machinery. The rear end of the shaft or spindle *a* carries a pinion, *i*, which gives rotation to the shafts *k* and *l* by means of the trains of toothed wheels, hereinafter described. The shafts *k l* work in bearings at the tops of the uprights *m m*, turning upon the shafts *n n*. The front ends of the shafts *k l* carry the rolls *p q p q*. The said rolls *p q p q* rotate in the same direction, the blank *h* to be screw-threaded by the action of the said rolls turning in an opposite direction and with the same surface velocity as that of the rolls.

Fig. 5 represents in front elevation, and Fig. 6 in side elevation, one of these rolls drawn of the full size. The two rolls *p q* exactly resemble one another. I will therefore only describe one of the said rolls. The roll *p q* is made up of the disk or carrier *p*, fixed on the shaft driving it, and separate pieces or sectors *q q*, fixed to the disk or carrier *p* by means of screw-bolts screwed into the said pieces or sectors, as will be understood by an examination of the drawings. Two, three, or more sectors may be employed.

In the drawings I have represented machinery having three sectors, and in the diagram Figs. 7 and 8 I have represented four sectors. Each of the sectors *q* is provided with one or more projecting ribs or threads, the said ribs or threads having the same inclination to the axis of the roll as the screw-thread to be produced has to the axis of the screw. The diameter of the roll and the length of each sector is such that the projecting ribs or threads on each sector are of a length equal to the length of the screw-thread to be made on the blank.

In the elevation, Fig. 6, the upper rib or thread, $r$, is that which operates first upon the blank, and the lower rib or thread, $s$, is that which operates next upon the blank. The relation of the ribs or threads on the sectors to one another will be understood by reference to Fig. 7, which is a diagram representing the cylindrical surface of four sectors and the ribs or threads upon them opened out into a plane figure, portions being broken away, and Fig. 8 represents sections of the several ribs or threads on the sectors with elevations of the screw-thread which they respectively produce and perfect.

The diagram Fig. 7 is drawn to a scale double that of Figs. 1, 2, 3, and 4, and the sections, Fig. 8, are drawn to a scale double that of Fig. 7. The first of the sectors $q$ may have one or two ribs or threads, (marked $r$;) but I prefer two, and of a V shape, which ribs, by their action on the rotating blank, produce V-shaped grooves in the said blank, the displaced metal causing the blank to elongate in the direction of its smaller end. The second of the sectors $q$ has one or two ribs or threads, preferably two, (marked $s$,) which are of a shape to give the V-shaped grooves formed by the first sector a trough-like figure—that is, to make the bottom of the grooves on each side of the rib flat. The third of the sectors $q$ has two ribs or threads, (marked $t$,) the spaces between which ribs or threads correspond to the thread which has been roughly formed by the second sector. By the operation of this third sector the screw-thread on the blank is nearly perfected. The fourth of the sectors $q$ may have its whole acting surface covered with ribs or threads $u$, having in cross-section a figure the exact counterpart of the screw-thread to be made on the blank. By the action of the last sector the screw-thread formed on the blank is perfected.

When I use three sectors, as represented in the several figures of the machinery, I employ ribs or threads of the kind marked in the diagram $r$, $t$, and $u$. By combining in the first sector one of the angular ribs or projections, $r$, with one of the square ribs of the second sector of the kind marked $s$ in the diagram the second and third sectors may be omitted. In this case the angular rib or projection of the kind marked $r$ makes an angular groove, into which the adjacent rib of the kind marked $s$ takes after the blank has performed one rotation and flattens the bottom of the said groove, the figure of the thread being afterward perfected by the action of a sector having ribs of the kind marked $u$. The rolls $p\ q\ p\ q$ are adjusted and supported with the required nicety by means of the adjusting-screws $w\ w$. These screws, which work in screw-boxes formed near the summits of the strong brackets $x\ x$ on the base of the machine, bear against the arms or levers $y\ y$, turning upon the centers $y^2\ y^2$, and carry near their upper ends rollers $y^3$. These rollers $y^3$ bear against the plain parts or carriers $p\ p$ of the rolls $p\ q\ p\ q$, and maintain the said rolls at the required distance apart.

In order that the thread may not exceed in diameter the original blank, the distance between the faces of the die at the base of the ridges, which faces determine the diameter of the thread as the top of the ridges do the reduced part or groove between the threads, should not exceed the diameter of the blank. As shown, said distance equals that diameter.

In order to make the groove between the threads of the screw of progressively greater depth from its commencement to the point of the screw, the ribs or threads on the several sectors are made slightly eccentric, the ends of the said ribs or threads of shortest radius coming first into operation.

In order to form the screw-thread on that part of the blank near its point where the diameter of the blank rapidly diminishes, the impressing ribs or threads of the rolls must approach each other rapidly. This may be effected by means of cams made to operate on the bearings of the rolls; but I prefer to effect it by means of an eccentric, $p^2$, (see Fig. 5,) formed on the disk or carrier $p$ of the roll near the point at which the last sector terminates. These eccentrics coming on the rotation of the rolls against the bearing-rollers $y^3\ y^3$, the rolls $p\ q\ p\ q$ are made to approach each other at the required times and to the required extent.

The mechanism by which the point of the blank is turned into a conical figure before the rolls $p\ q\ p\ q$ operate upon it is the same as that employed in other screw-making machines. This mechanism is represented in the side elevation, Fig. 1, and plan, Fig. 2, but is omitted in Figs. 3 and 4. The said mechanism constitutes no part of my invention, and by its omission in Figs. 3 and 4 the essential and novel parts of the machinery are more clearly exhibited.

In some kinds of wood-screws the screw-thread and the depression between the convolutions of the thread have the relation represented on a large scale in Fig. 9—that is, the thread of the screw has the same diameter as that portion of the blank unoperated upon, excepting at the end, where the diameter of the thread rapidly diminishes. The depression or groove between the convolutions of the thread is shallow at the part nearest the head of the screw and gradually deepens. Its depth remains uniform until it approaches the point of the screw, where it rapidly increases, reducing the diameter of the screw to a point. In other words, the body of the screw (the thread being removed) first tapers from the original diameter of the blank, then is cylindrical for the greater part of its length, and, finally, rapidly tapers near the end to a point. In making screws of this kind I prefer to employ rolls of the kind illustrated by the said Fig. 9, in which figure the finishing-sector marked $u$ in Figs. 7 and 8 is represented in contact with the finished screw. The roll represented is not cylindrical, but increases in diameter from the part which is nearest the head of the blank toward the end. The exact sectional figure of the roll is represented in Fig. 10. On a roll of this kind the impressing ribs or projections hereinbefore described are made. When rolls of this kind are employed, they do not require to be made to approach each other during rotation, as described with respect to the rolls $p\ q$ in the several figures, and the said rolls, consequently, do not require the eccentrics $p^2$, Fig. 5.

Rolls of the kind represented in Figs. 9 and 10 may also be used for making other kinds of screws besides screws of the kind shown in Fig. 9, the section of the roll without the impressing ribs or projections corresponding to the section of the screw without its thread. In all cases where the rolls are of the kind last described with reference to Figs. 9 and 10, the mechanism for making the rolls approach each other during rotation is dispensed with.

The hopper and feeding mechanism for supplying the blanks to the machine I have marked with the letter $f$, to distinguish them from the more essential and novel parts of the machinery. The required motions of the hopper and feeding mechanism are taken from a pulley on the shaft $k$ by means of the band $f^2$. The clams $g$ are operated through the hollow spindle $a$ in the ordinary way. The rolls $p\ q\ p\ q$ are driven from the shaft $a$ in the following manner: The pinion $i$ on the rear end of the shaft $a$ gears with the toothed wheel 2. The toothed wheel 2 gears with the toothed wheel 3. A pinion, 4, carried by the axis of the toothed wheel 3, gears with the toothed wheel 5, a pinion, 6, on the axis of which gears with the toothed wheel 7. The toothed wheel 7 is on one end of a sleeve, the other end of which carries the toothed wheel 8. The toothed wheel 8 gears with the toothed wheel 10, fixed on the shaft $l$ of the left-hand roll, Fig. 4. The roll on the right-hand side, Fig. 4, is driven from the pinion 6 by means of trains of wheels the counterpart of those just described—that is, the said pinion 6 gears with the toothed wheel $7^2$ on the end of a sleeve, the other end of which carries the toothed wheel $8^2$. The toothed wheel $8^2$ gears with the toothed wheel $10^2$, fixed on the spindle of the right-hand roll. (See Fig. 4.)

I will now briefly describe the action of the machinery. The rolls $p\ q\ p\ q$ being adjusted and supported at the proper distance apart by means of the screws $w\ w$, and rotatory motion being given to the shaft $a$, a blank, $h$, is fed into the machine and gripped and held by its head in the claws or clams $g$, and is put into rapid rotatory motion. The blank $h$ is fed between the rolls when three or two sectors are employed, when those portions of the rolls having no sectors upon them are opposed to each other. When four sectors are employed, the last portion of each of the fourth sectors is removed in order to allow sufficient room between the rolls, when the said cut-away parts are opposed to each other, to permit of the introduction between them of the blank. By the rotation of the rolls the ribs or threads on the several sectors of the said rolls are in succession made to operate upon the blank and produce a screw-thread upon it, the rapid rotation of the blank and the slow rotation of the rolls being so arranged with respect to each other that the surface motion of the blank and that of the sectors of the rolls is at the same rate. In other words, the rate of rotation given to the blank is that which the rolls would tend to communicate to it if it had no rotary motion of its own. After a complete rotation of the two rolls $p\ q\ p\ q$ the screw-thread is formed, and by the opening of the clams $g$ the screw thus made is removed from the machine in the ordinary way. The screw produced has a thread the diameter of which does not exceed that of the blank from which it is made, the metal displaced by the action of the rolls traveling longitudinally, thereby lengthening the blank, instead of escaping radially, and making the thread of the screw produced of greater diameter than the blank from which it is made.

Although I have described the method which I prefer to employ of making up the impressing-rolls $p\ q$, which method of construction I find to answer well in practice, yet the said rolls may be built up in other ways; or each roll may consist of one piece of steel instead of being made up of the carrier $p$ and the sectors $q\ q$; and although I have only described my invention as applied to the manufacture of a screw of the kind called a "wood-screw," yet my invention is applicable to the manufacture of metallic screws and screw-bolts in general, and to other metallic articles having screw-threads upon them—such, for example, as augers and gimlets, gas-tubes, and the like.

The application of my invention to the manufacture of metallic screws and screw-bolts and other metallic screwed articles differs in no essential respect, so far as the formation of the screw-thread is concerned, from the application of my invention to the manufacture of wood-screws hereinbefore described, the size of the rolls and the sectional figure of the ribs or projections upon them being varied to suit the size of the screws and screwed articles to be wormed or screw-threaded and the configuration of the screw-thread to be produced.

Articles other than screws may be fed into the machine by hand, the hopper and feeding mechanism and the pointing mechanism hereinbefore described being in that case dispensed with.

Having now described the nature of my in- vention and the manner in which the same is to be performed, I wish it to be understood that I claim—

1. The die for rolling threads on screws and other articles, provided with two or more sets of projecting ribs arranged on different and successive sections, and having the face plain in each section in advance of the ribs thereon, substantially as described.

2. The die for rolling threads on screws and other articles, provided with three or more sets of projecting ribs arranged on different and successive sections of the die, the face of the die in advance of the ribs in two or more sections being plain and in the others covered with ribs, substantially as described.

3. The die for rolling threads upon screws and other articles, provided with two or more sets of projecting ribs upon different and successive sections of the die, the ribs of the first section being triangular and those of succeeding sections trapezoidal in cross-section, substantially as described.

4. A die for rolling threads on screws and other articles, the same having projecting ribs of a triangular cross-section for acting first upon the blank, and projecting ribs of like elevation or pitch, but of trapezoidal section, for acting afterward upon said blank, substantially as described.

5. The combination, with the two roller-dies turning in the same direction, of the rotatory holder having jaws for clamping the blank during the action of said dies, and the toothed gearing connecting positively the shafts of said dies with that of said holder, substantially as described.

6. The machinery for worming or threading metallic screws or other articles with threads of a diameter not exceeding that of the screw-shank, by rolling blanks between dies to form first a V-shaped spiral groove of suitable depth, and then widening the said groove at the bottom, said machinery comprising the cooperating dies with the ridges, part of them V-shaped, and part of them trapezoidal in cross-section, arranged and operating, as explained, so as to roll in and extend the metal of the blank without expanding the same, and thereby increasing the diameter of the threads beyond that of the original blank, substantially as described.

JOHN SHELDON. [L. S.]

Witnesses:
RICHARD SKERRETT,
ARTHUR J. POWELL.